US012675413B2

(12) United States Patent
Richardson et al.

(10) Patent No.: US 12,675,413 B2
(45) Date of Patent: Jul. 7, 2026

(54) CACHE LINE INVALIDATION TECHNOLOGIES

(71) Applicant: Intel Corporation, Santa Clara, CA (US)

(72) Inventors: Bruce Richardson, Shannon (IE); Niall D. McDonnell, Limerick (IE); Subhiksha Ravisundar, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/707,010

(22) Filed: Mar. 29, 2022

(65) Prior Publication Data

US 2022/0214973 A1    Jul. 7, 2022

(51) Int. Cl.
| | |
|---|---|
| *G06F 12/08* | (2016.01) |
| *G06F 9/38* | (2018.01) |
| *G06F 12/0808* | (2016.01) |
| *G06F 12/0842* | (2016.01) |
| *G06F 12/0891* | (2016.01) |

(52) U.S. Cl.
CPC ........ *G06F 12/0891* (2013.01); *G06F 9/3816* (2013.01); *G06F 12/0808* (2013.01); *G06F 12/0842* (2013.01)

(58) Field of Classification Search
CPC ...... G06F 12/12; G06F 12/08; G06F 12/0891; G06F 9/3816; G06F 12/0808; G06F 12/0842
See application file for complete search history.

(56) References Cited

U.S. PATENT DOCUMENTS

| | | | | |
|---|---|---|---|---|
| 10,846,230 B2 * | 11/2020 | Kumar | ............... | G06F 9/30047 |
| 10,956,338 B2 * | 3/2021 | Lai | ...................... | G06F 12/0804 |
| 2009/0083496 A1 * | 3/2009 | Stevens, Jr. | ......... | G06F 12/0808 |
| | | | | 711/E12.078 |
| 2012/0206466 A1 * | 8/2012 | Sharp | ........................ | G06T 1/60 |
| | | | | 345/543 |
| 2014/0019691 A1 * | 1/2014 | Dally | ................. | G06F 12/0895 |
| | | | | 711/144 |
| 2014/0173216 A1 * | 6/2014 | Jayasena | ............. | G06F 12/0891 |
| | | | | 711/135 |
| 2017/0286111 A1 * | 10/2017 | Pereira | ................ | G06F 11/3466 |

(Continued)

FOREIGN PATENT DOCUMENTS

WO    WO-2017155915 A1 *  9/2017  ......... G06F 12/0817

OTHER PUBLICATIONS

INVD Invalidate Internal Caches, x86 Instruction Set Reference, Intel® 64 and IA-32 Architectures Software Developer's Manual vol. 2A:Instruction Set Reference, A-L, https://c9x.me/x86/html/file_module_x86_id_143.html, Sep. 2016, p. 3-469.

(Continued)

*Primary Examiner* — Pierre Michel Bataille
(74) *Attorney, Agent, or Firm* — Compass IP Law PC

(57) ABSTRACT

Examples described herein relate to a device issuing a single command to request invalidation of multiple cache lines associated with a memory address range in a cache device. In some examples, the cache device is associated with the processor. In some examples, the processor comprises one or more of a central processing unit (CPU), core, or graphics processing unit (GPU).

21 Claims, 8 Drawing Sheets

(56) References Cited

U.S. PATENT DOCUMENTS

| | | | | |
|---|---|---|---|---|
| 2018/0366180 A1* | 12/2018 | Murphy | .............. | G11C 11/4091 |
| 2019/0138448 A1* | 5/2019 | Li | ....................... | G06F 12/0868 |
| 2023/0305957 A1* | 9/2023 | Fetterman | ........... | G06F 12/0891 |

OTHER PUBLICATIONS

Mccalpin, John D., "Intel's future "CLDMOTE" instruction", John McCalpin's blog, https://sites.utexas.edu/idm4372/2019/02/18/intels-future-cldemote-instruction/, Feb. 18, 2019, 4 pages.
Uvarov, Maxim, "OpenDataplane project", Linaro Networking Group, ENOG 15, Moscow, Russia, Jun. 4-5, 2018, 30 pages.

* cited by examiner

FIG. 5

CACHE LINE INVALIDATION TECHNOLOGIES

BACKGROUND

During execution of applications, memory utilization of applications for networking uses (e.g., memory footprint) can grow based on an amount of time that data is stored in memory and bandwidth of data transmission. Applications can store and process data from a cache device. However, as a cache device has a limited capacity, an increasing memory footprint of data may not fit within the cache. In addition, Intel® Data Direct I/O Technology provides the capability for a network interface device to write data from a received packet to a last level cache (LLC) cache device. After data is copied to LLC, the data can be processed and remain in the cache device, contributing to utilization of the cache device.

To reduce memory footprint, OpenDataPlane and Data Plane Development Kit (DPDK)-based software attempts to reuse buffers. For example, after content of a buffer has been transmitted by a network interface controller (NIC), a descriptor associated with that buffer can be placed on a NIC receive (RX) descriptor ring so that the buffer can be re-used and the associated memory is recycled. As network speeds increase, the amount of memory buffers increases, and the number of descriptors in a NIC RX descriptor ring increases. Increasing amount of buffers increases memory footprint.

BRIEF DESCRIPTION OF THE DRAWINGS

FIG. 5 depicts an example of a Peripheral Component Interconnect Express (PCIe) consistent transaction layer packet (TLP) Processing Hint (TPH).

DETAILED DESCRIPTION

Figure 1:
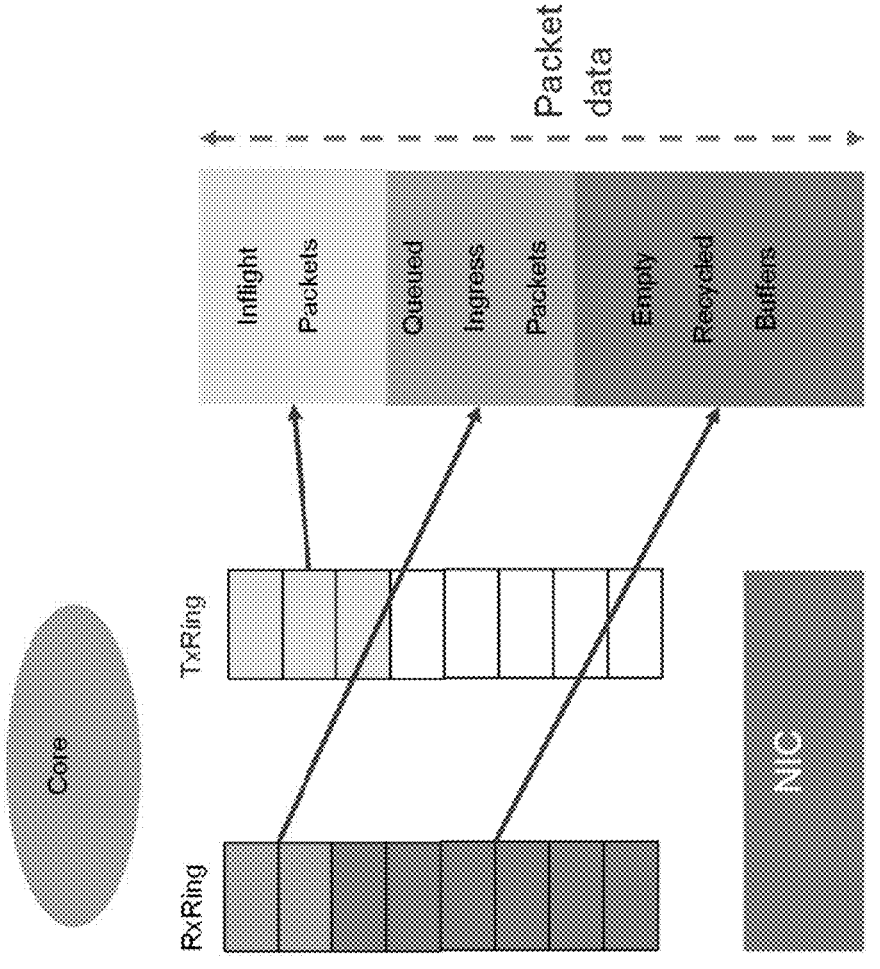
FIG. 1 shows an example of memory buffer utilization by processed executed by a core.

FIG. 1 shows an example of memory buffer utilization by processed executed by a core. For example, virtual network functions (VNFs) can utilize a receive descriptor ring (RxRing) and transmit descriptor ring (TxRing) to respectively identify memory buffers with content to receive or transmit. As the number of packets that are transmitted and received grows, an amount of memory utilized can grow. Memory buffers can be allocated for data to be processed by a core or device (e.g., network interface device or accelerator). After the device has processed data in the memory buffer, if a data buffer is no longer in use, the device can provide the buffer for reuse by making the buffer available to be written-to. A manner of recycling the buffer is to identify the buffer in a descriptor. However, the buffer is overwritten with data when the device writes to the buffer or software writes to the buffer. If descriptors referencing available buffers are accessed in first in first out (FIFO) order, the recycled buffer may not be reused until a time interval passes and the descriptor is read and written-to. For example, if a descriptor ring is 1,000 descriptors deep and the packets arrive at 1 million packets per second (MPPS), a millisecond could elapse before the buffer is reused.

Figure 2:
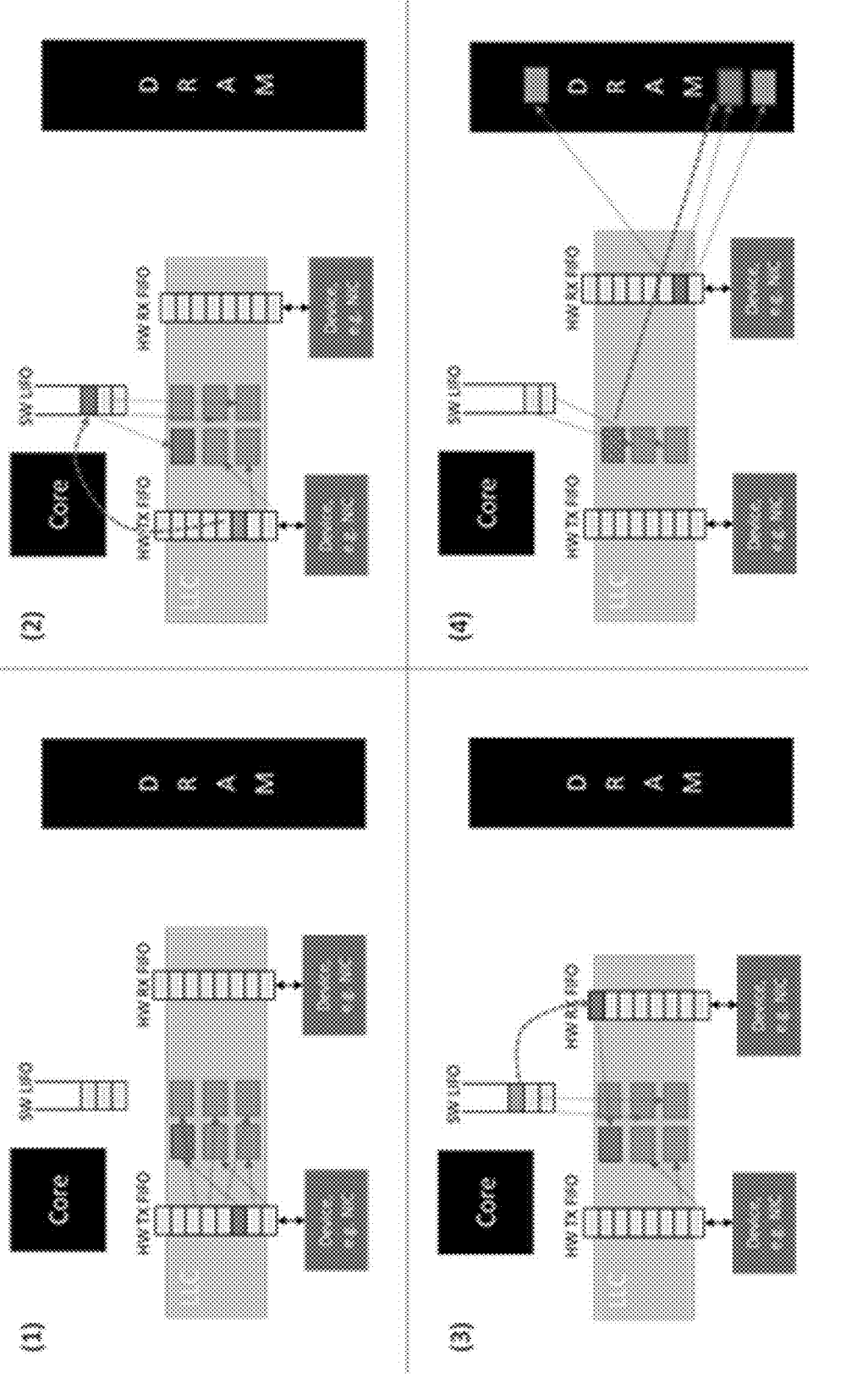
FIG. 2 depicts an example sequence of operations.

FIG. 2 depicts an example sequence of operations. A core executing a process causes reads of data into the cache, which causes eviction of data from the cache. As more time passes, the more work is performed by the core and the greater the probability that content of cache lines are evicted as the core accesses new data that is stored into the cache. In operation (1), a buffer is identified in a first in first out (FIFO) buffer for some time until cleanup is performed by a core, placing the buffer inside a last in first out (LIFO) buffer for re-use. In operation (2), a reused buffer can be placed at the tail of another device FIFO, such as for a network interface controller's receive (RX) ring. In operation (3), by the time the buffer is at a head of the FIFO, data in the buffer may have been evicted from cache to memory, as shown in operation (4), causing memory bandwidth to be used for data.

Some technologies, such as DDIO (and similar technologies), allow a portion of the cache to be written-to. For example, an 8 MB memory footprint may be too large for a cache size of 30-40 MB, as most of the cache space is not available for packet buffers written-to by DDIO.

Freeing cache space from storing data that is not to be processed or read can increase available cache space. As data is written to cache, the data does not match the data in memory for the corresponding address and the data in the cache is considered dirty. When there is cache congestion or insufficient available cache space, victimization occurs whereby new data overwrites older data in the cache. If contents of a cache line is dirty, the data is written to the corresponding address in memory, which can consume memory bandwidth. Reducing flushes of data from cache to memory can reduce utilization of memory bandwidth for writes to memory and allow memory bandwidth to be utilized for other reads or writes to memory. In addition, reducing memory bandwidth can reduce power utilization.

At least to attempt to reduce an amount of cache space utilized by a device and to attempt to reduce an amount of memory bandwidth utilized to copy data from a cache to a memory device, a device can invalidate cache lines in connection with reading data or issue a command to invalidate the cache lines. To free cache line space for new entries, a device can request cache line invalidation with reading data from the cache line or the device can request cache line invalidation without reading data from the cache line. After a buffer is recycled, there is no associated valid cache entries, and no data to evict, which can reduce use of memory bandwidth to write to memory. Examples described with respect to cache line eviction can refer to cache line eviction and/or invalidation. Examples described with respect to cache line invalidation can refer to cache line eviction and/or invalidation.

Figure 3:
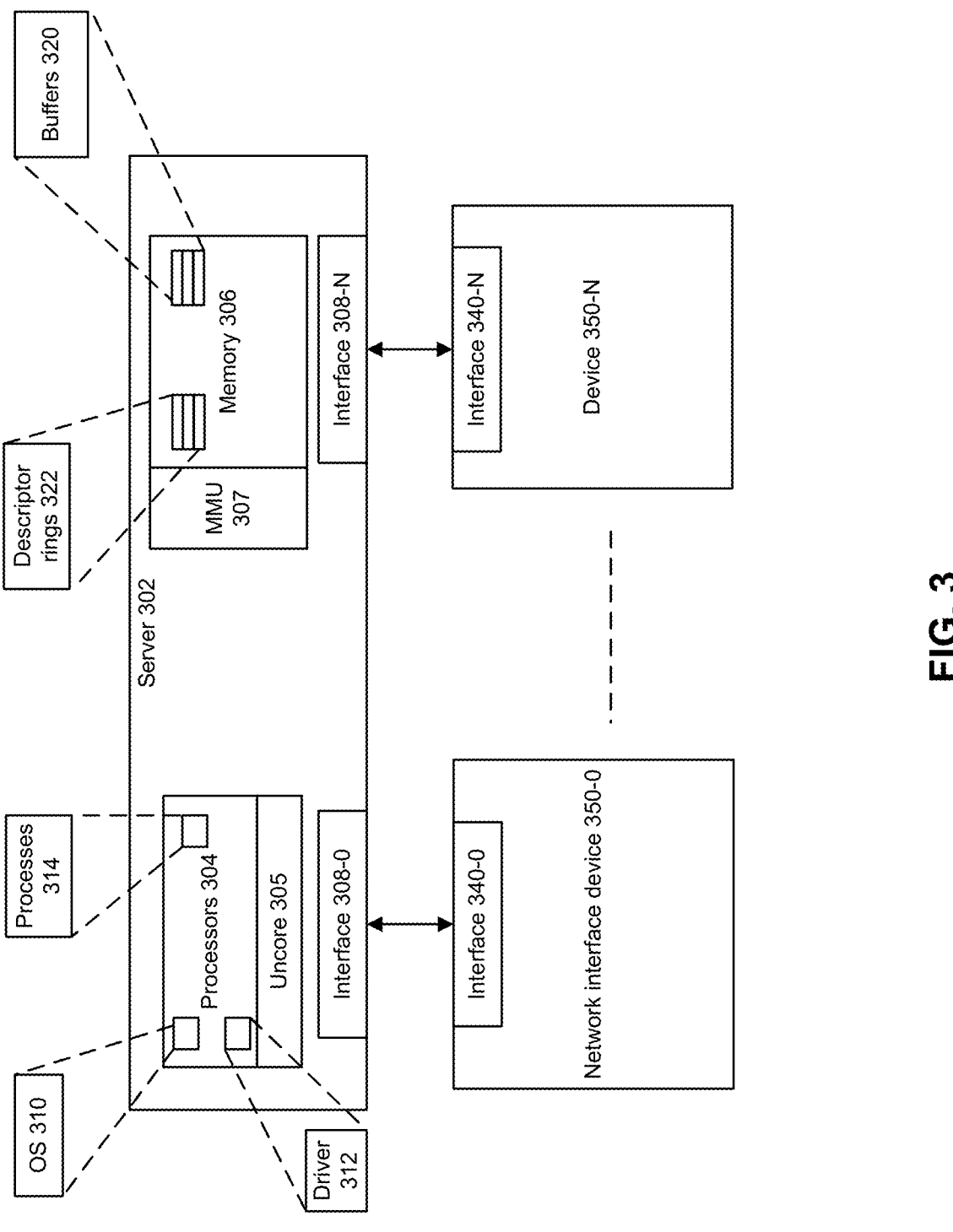
FIG. 3 depicts an example system.

FIG. 3 depicts an example system. Server 302 can include or access one or more processors 304, uncore 305, memory 306, memory management unit (MMU) 307, and device interface 308, among other components described herein (e.g., devices 350-0 to 350-N, interfaces 308-0 to 308-N, interconnects, and other circuitry). Processors 304 can execute one or more processes 314 (e.g., microservices, virtual machines (VMs), containers, or other distributed or virtualized execution environments) that process data. Various examples of processors 304 are described herein at least with respect to FIG. 7 and/or FIG. 8.

In some examples, uncore (e.g., system agent) 305 can include or more of: a memory controller, a shared cache (e.g., level-1, level-2, and/or lower or last level cache (LLC), among others), a cache coherency manager, Caching and home agent (CHA), Caching Agent (CA), Home Agent (HA), arithmetic logic units, floating point units, core or processor interconnects, or bus or link controllers. Caching agent (CA) of uncore 305 can attempt to determine whether another core or processor has access to the same cache line and corresponding memory address to determine cache coherency. Where another core or processor has access to the same cache line and corresponding memory address, the CA can provide data from its cache slice or obtain a copy of data from another core's cache. HA can determine where copies of buffer address are in cache hierarchy. HA can attempt to provide data coherency among cache devices and one or more memory devices (e.g., memory device 306). HA can track state changes to one or more cache lines.

In some examples, operating system (OS) 310, driver 312, and/or processes 314 can configure uncore 305, and a particular CA and/or HA to read and/or invalidate one or more cache lines, as described herein. Invalidation of cache lines can free the one or more cache lines and allow them to be written-to or overwritten. In some cases, invalidation of the one or more cache lines does not cause data associated with the invalidated one or more cache lines to be written-back to memory when the dirty (modified) cache line entry is reused to store other data, thereby avoiding use of memory bandwidth to copy data in the cache to memory 306.

Devices 350-0 to 350-N can be communicatively coupled to interfaces 308-0 to 308-N of server 302 using respective interfaces 340-0 to 340-N, where N is an integer of 1 or more. Interfaces 340-0 to 340-N can provide device interfaces to communicate with respective interfaces 308-0 to 308-N. In some examples, interfaces 308-0 to N and interfaces 340-0 to N can communicate based on Peripheral Component Interconnect Express (PCIe), Compute Express Link (CXL), Universal Chiplet Interconnect Express (UCIe), or other connection technologies. See, for example, Peripheral Component Interconnect Express (PCIe) Base Specification 1.0 (2002), as well as earlier versions, later versions, and variations thereof. See, for example, Compute Express Link (CXL) Specification revision 2.0, version 0.7 (2019), as well as earlier versions, later versions, and variations thereof. Devices 350-0 to 350-N can include one or more of network interface device 350-0, accelerator, storage device, memory device (e.g., memory pool with dual inline memory modules (DIMMs)), graphics processing unit, audio or sound processing device, and so forth. See, for example, UCIe 1.0 Specification (2022), as well as earlier versions, later versions, and variations thereof.

Interfaces 340-0 to 340-N and interfaces 308-0 to 308-N can provide communications between devices 350-0 to 350-N and processor 304 where one or more of devices 350-0 to 350-N are located on different dies than that of processor 304; provide communications between devices 350-0 to 350-N and processor 304 where one or more of devices 350-0 to 350-N are located on different chips than that of processor 304; devices 350-0 to 350-N and processor 304 where one or more of devices 350-0 to 350-N are located on different chiplets than that of processor 304; devices 350-0 to 350-N and processor 304 where one or more of devices 350-0 to 350-N are located on different circuit boards than that of processor 304; or devices 350-0 to 350-N and processor 304 where one or more of devices 350-0 to 350-N are located on different packages than that of processor 304. In some examples, interfaces 340-0 to 340-N and interfaces 308-0 to 308-N can provide communications using Embedded Multi-Die Interconnect Bridge (EMIB).

Network interface device 350-0 can be implemented as one or more of: a network interface controller (NIC), a remote direct memory access (RDMA)-enabled NIC, Smart-NIC, router, switch, forwarding element, infrastructure processing unit (IPU), or data processing unit (DPU). Interface 308-0 can include circuitry to directly write to a processor cache. An example of circuitry to directly write to a processor cache is consistent with Intel® Data Direct I/O Technology or other technologies that allow a device to write to a processor's cache device.

OS 310 could configure memory management unit (MMU) 307 and/or input-output memory management unit (IOMMU) in one or more of interfaces 308-0 to 308-N with an indication of whether an invalidation operation of one or more cache lines in a cache is permitted to be performed at a request of a particular requester. For example, MMU 307 and/or input-output memory management unit (IOMMU) can store a permission indicator per process address space identifier (PASID) that indicates whether a particular PASID can request an invalidation operation of one or more cache lines in a cache. OS 310 can allow or not allow a device as a permitted process associated with virtual function (VF) to invalidate one or more cache lines in a cache. OS 310 has to be able to control which processes (e.g., PASIDs) can request a device to perform invalidate operations by granting permission or denying permission. This permission could default to OFF so that legacy operating systems are not compromised.

A process can request that invalidation occur as part of the read of a memory address range, and if the device supports issuing a command of invalidation with read, the device can request invalidation with read of the memory address range. For devices that do not support invalidation with read, the device can request invalidation of the memory address range. For security reasons, OS 310 can overwrite with zeroes new memory regions it allocates to a process to stop the process from accessing legacy data which might belong to a previous process. However, such writes are not guaranteed to go to memory, and may stay in the cache, and the data of the previous process may still be in the copy of the cache lines in memory. If the process could invalidate the cache (e.g., using a device or otherwise), the process could invalidate the allocated memory region and then try to read the allocated memory region to access legacy data OS 310 attempted to overwrite. Accordingly, OS 310 can control what requester process or device can invalidate data in the cache. If OS 310 allows a process to request a cache line invalidation, OS 310 issues non-temporal writes to overwrite memory it allocates to the process to overwriting the legacy data in memory.

Based on its configuration, MMU 307 and/or IOMMU could check whether permission is granted to perform a request to invalidate one or more cache lines. In some cases, read-invalidate that fail the check would deprecate to reads or explicit-invalidates that fail the check would be dropped. Cache lines can be marked as invalid as a hint when accessing those cache lines to discard unwanted data and free up cache space without generating writebacks to memory and use memory bandwidth.

If the data in the cache lines were modified relative to data that is stored in memory and associated with the same memory addresses (e.g., dirty) compared to a version stored in memory or another cache, a writeback of the data in the cache lines to memory or another cache does not occur based on the device requesting a cacheline invalidation. If the read is performed from memory, instead of cache because the data in the cache had been replaced (e.g., victimized) by other data, the data is not written to cache based on the device requesting a cacheline invalidation. Alternatively, the data may be written to cache and allocated as least recently used (LRU) based on the device requesting a cacheline invalidation.

Although some operating systems clear contents of memory pages before allocating the memory to a process, invalidating data in a cache can cause cleared data to become accessible once again. To avoid ability to read data invalidated in a cache from memory, when new memory pages are allocated to a process and OS 310 had permitted the process to perform an invalidation of corresponding cachelines, a flush write from cache and memory (e.g., CLFLUSH) can occur to clear the memory. OS 310 can clear or overwrite contents of memory with a flush write to clear legacy data after granting or enabling cache invalidation support for a particular process and device.

A device or process can request invalidation in a descriptor. For example, a flag in the NIC transmit (Tx) descriptor or compression workload descriptor can be set to indicate a request to invalidate a memory address range associated with one or more cache lines. In some examples, a descriptor ring in descriptor rings 322 can be associated with permitted or not permitted requests to invalidate one or more cache lines. Driver 312 could control the invalidate feature on a particular ring or work queue basis. A work queue can store workload descriptors from one or more devices or processes.

In some cases, an OS applies a configuration that reads from a given device are to be performed as read-invalidate. In some cases, an OS applies a configuration that ranges of memory addresses are encoded such that reads from a specific PCIe device are performed as read-invalidate.

A device can transmit a cache line invalidate command using a device interface. For example, a PCIe or CXL communication can request read, read-invalidate, or invalidate. A DMA engine in a device can request cache invalidate.

Devices using ATS could cache per PASID permissions and can decline or permit address translation from a device and subsequent cache invalidate.

For example, if data is stored in cache and not in memory and the data is transmitted or read by a device, the cache lines associated with the data is considered dirty because content of the cache does not match content of memory, and a processor can evict dirty data to memory. Evicting data to memory incurs memory bandwidth to write data to memory. As described herein, when a device reads data from cache, the device can invalidate the cache lines that stored the data so that there is no write back of data to memory and those invalidated cache lines can be available for reuse. Where data is transmitted in a packet by a network interface device, the network interface device can invalidate the packet data in the cache as it is no longer needed after it has been transmitted. For accelerators that perform transformations on data with the output going to a new buffer (e.g., compression or decompression or forward error correction (FEC) encoding or decoding), original source buffers can be invalidated as soon as the device determines they are no longer to be accessed.

Devices can perform cacheline invalidation as a service, allowing applications to free cache space by discarding data from cache without taking central processing unit (CPU) cycles. For example, within a Transmission Control Protocol (TCP) stack, one receipt of an acknowledgement (ACK) message could allow discarding TCP packet data, held for potential re-transmit, from cache.

Figure 4:
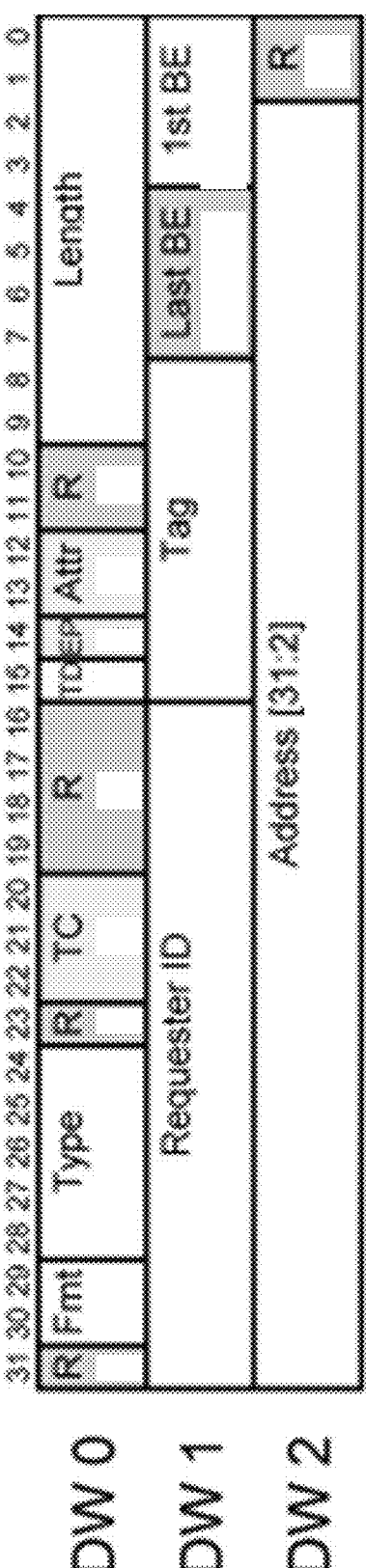
FIG. 4 depicts an example format of a header with a cache line invalidation request.

FIG. 4 depicts an example format of a PCIe transaction layer packet (TLP) header. A device can request a read from memory and the request can include a flag that requests to invalidate one or more cache line(s) using a PCIe header. For example, traffic class (TC), Error/Poison (EP), and/or attribute (Attr) fields can indicate whether read, read-invalidate, or merely invalidate one or more cache line(s) associated with an address specified in double word DW2.

Figure 5:
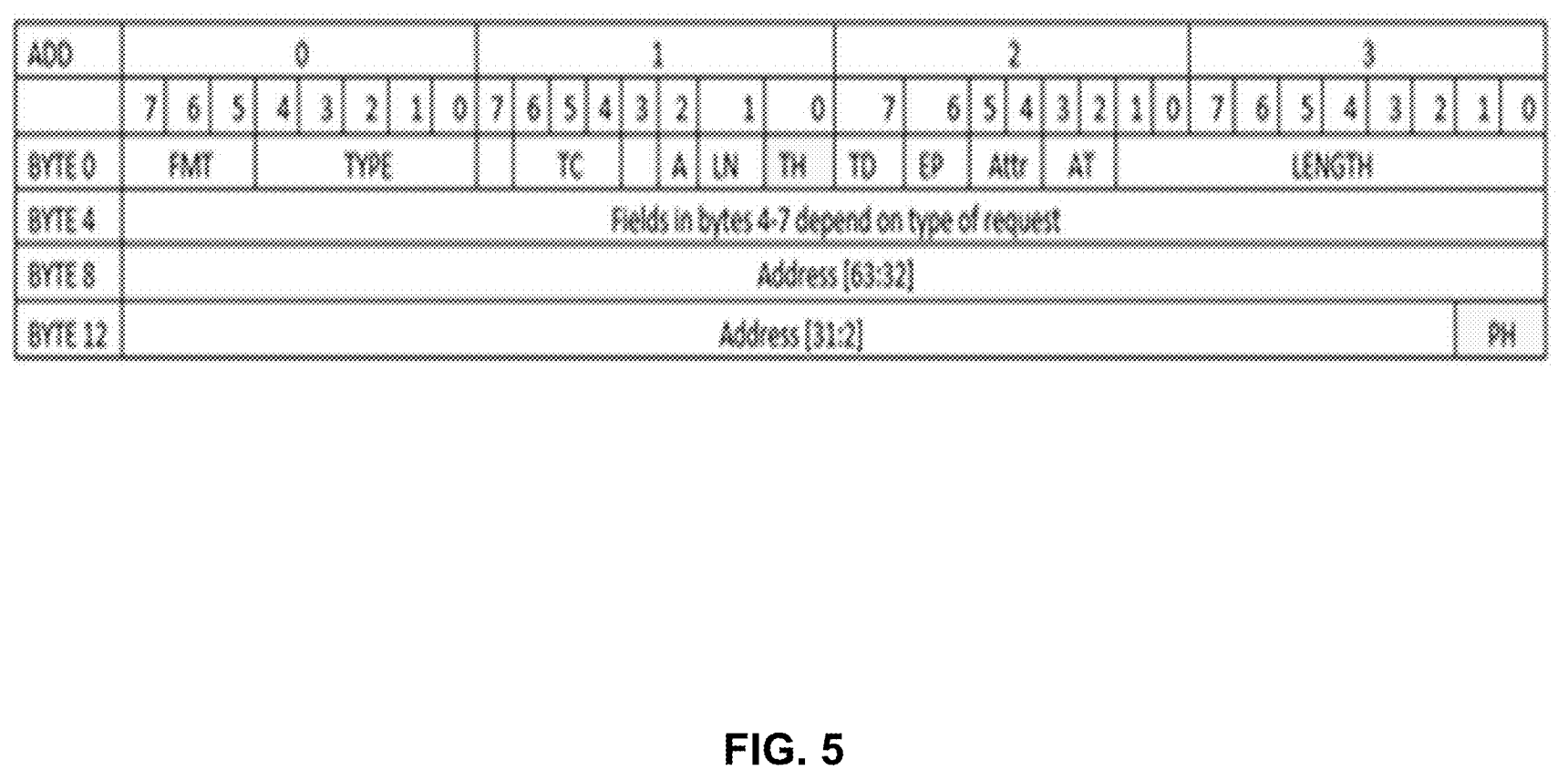

FIG. 5 depicts an example of a PCIe consistent transaction layer packet (TLP) Processing Hint (TPH). For requests that target memory space, a value of 1b in the TH bit can indicates the presence of TPH in the TLP header and optional TPH TLP Prefix (if present). The TH bit and/or PH bit can be used to indicate a command to perform a read, read and invalidate, or merely invalidate one or more cache line(s) associated with an address specified in bytes 8 and 12.

Figure 6:
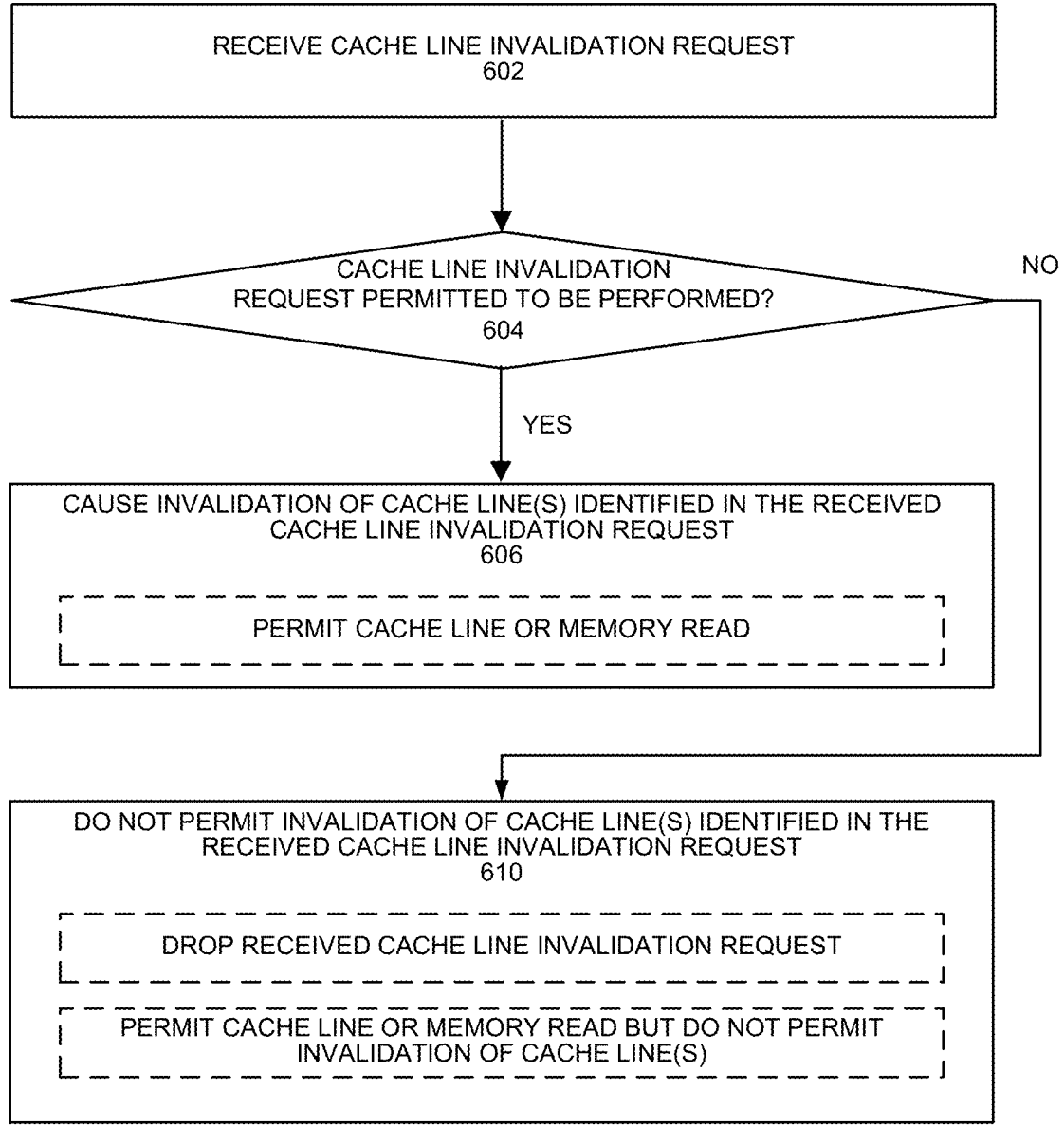
FIG. 6 depicts an example process.

FIG. 6 depicts an example process. The process can be performed by a caching/home agent (CHA) or caching agent (CA). At 602, a cache line invalidation command can be received from a device or process. For example, a cache line invalidation command can be indicated in one or more of: a request to read a memory address range and invalidate one or more cache lines corresponding to the memory address range, one or more bit flag in a packet transmit descriptor with a memory address range corresponding to the cache lines, a workload performance request, a request from direct memory access (DMA) circuitry to read data from a memory address range corresponding to the cache lines, a particular descriptor ring or rings for which cache lines corresponding to memory address ranges in descriptors in the particular descriptor ring or rings are to be invalidated, or a request in a TPH to invalidate a memory address range corresponding to the cache lines. In some cases reads from a given device are to be performed as read-invalidate. In some cases, ranges of memory addresses are encoded such that reads from a specific PCIe device are performed as read-invalidate.

At 604, a determination can be made as to whether the received cache line invalidation command is permitted to be performed. The received cache line invalidation command from a device or process can be performed based on at least one or more of: the cache line invalidation command is provided in a descriptor submitted on particular descriptor ring or rings on which cache line invalidation commands can be submitted and an IOMMU or MMU indicates a process address space identifier (PASID) of the requester device or process is permitted submit the request. Based on a determination the received cache line invalidation command is permitted to be performed, the process can continue to 606. Based on a determination the received cache line invalidation command is not permitted to be performed, the process can continue to 610.

At 606, the one or more cache lines identified in the received cache line invalidation command can be invalidated. If the received cache line invalidation command also indicates a request to read data from a memory address range in memory or one or more cache lines, the data can be read and provided to a requester. Invalidation of a cache line can identify the cache line as available to be overwritten. In some examples, copy of data in the invalidated cache lines to memory does not take place in response to performance of the received cache line invalidation command.

At 610, based on not permitting invalidation of one or more cache lines, the one or more cache lines identified in the received cache line invalidation command are not invalidated. For a request merely to invalidate one or more cache lines, the request can be dropped. In some cases, if the received cache line invalidation command also indicates a request to read data from a memory address range in memory or one or more cache lines, in addition to cache line invalidation, the data can be read and provided to a requester. In some cases, if a threshold number of requests to invalidate a cache line or lines is received and the requests are not permitted, an administrator can be notified in case there is a malicious attack or malfunction.

Various simulations are described next that correlate evictions with a size of a memory footprint occupied by data. It is assumed that the NIC is faster than the application for packet transmissions (Tx) and a limited build-up of packets occurs. A memory footprint can be represented as number of Rings*(receive descriptor ring (RxRing) depth+ Number of Inflight Packets)*Packet Size. The average depth of queued packets can depend on a number of factors including: burst size, CPU load percentage (e.g., average arrival rate of packets divided by the average CPU processing capability), traffic arrival pattern (e.g., random or irregular), and CPU processing pattern (e.g., regular (no interrupts)). For a M/D/1 queuing model, the average depth can be determined by the load p according to the formula: Average Q depth=$(2p-p^2)/2(1-p)$, Table 1 below shows an approximation of cache footprint (Avg Footprint).

| Traffic Pattern | | Markovian | |
| Service Pattern | | Deterministic | |
| Small Packets | 256 B | | |
| CPU Load | | 97% | 95% |
| Batch Size | | 32 | 28 |
| Average Queued Packets | | 532.9 | 279.3 |
| Average Packets | 640 B | | |
| CPU Load | | 70% | 60% |
| Batch Size | | 16 | 12 |
| Average Queued Packets | | 24.27 | 12.6 |
| Large Packets | 1024 B | | |
| CPU Load | | 55% | 45% |
| Batch Size | | 10 | 8 |
| Average Queued Packets | | 8.861 | 5.073 |
| Avg Footprint | 256 B | 12.92 | 8.77 MB |
| Avg Footprint | 640 B | 11.48 | 11 MB |
| Avg Footprint | 1024 B | 17.36 | 17.11 MB |

Accordingly, a substantial reduction in cache footprint can be achieved by cache eviction commands described herein.

Figure 7:
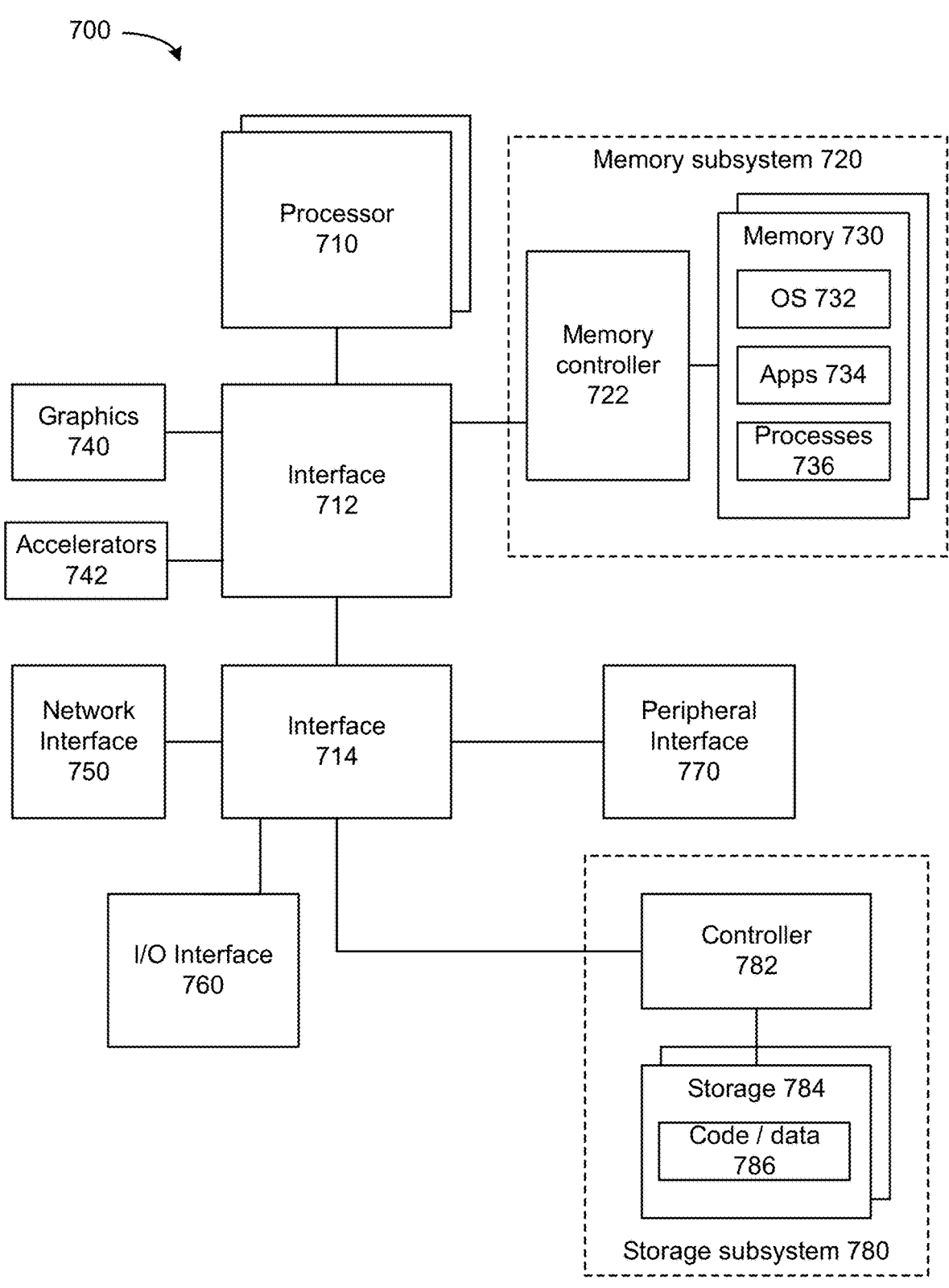
FIG. 7 depicts a system.

FIG. 7 depicts an example computing system. Components of system 700 (e.g., processor 710, network interface 750, and so forth) can be configured to request to invalidate one or more cache lines associated with a memory address range, as described herein. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function or programmable offload engine that can be accessed or used by a processor 710. For example, an accelerator among accelerators 742 can provide direct memory access (DMA) circuitry, data copy offload accelerators, compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 742 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

In some examples, OS 732 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, NVIDIA®, Broadcom®, Qualcomm®, IBM®, Texas Instruments®, among others. In some examples, OS 732 and/or driver can enable or disable an CA or CHA from invalidating multiple cache lines based on a request or instruction from a device, as described herein. In some examples, OS 732 and/or driver can configure an MMU or IOMMU as to which processes and/or devices are permitted to invalidate one or more cache lines associated with a memory address range. In some examples, OS 732 and/or driver can identify a memory address range for which cache line invalidation instructions can be performed.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 (e.g., packet processing device) can execute a virtual switch to provide virtual machine-to-virtual machine communications for virtual machines (or containers, microservices, or other virtual execution environments) in a same server or among different servers.

Some examples of network interface 750 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 750 can include a programmable pipeline or processors which can be programmed using Programming Protocol-independent Packet Processors (P4), C, Python, Broadcom Network Programming Language (NPL), NVIDIA® CUDA®, NVIDIA® DOCA™, or x86 compatible executable binaries or other executable binaries. In some examples, commands to invalidate or evict content of cache lines can apply to memory address ranges associated with shared memory caches accessible in a switch or by multiple different pipeline stages.

Graphics 740, accelerators 742, and/or network interface 750 can include Direct memory access (DMA) circuitry that can copy data to or from host memory, instead of copying the packet to an intermediate buffer at the host and then using another copy operation from the intermediate buffer to the destination buffer. In some examples, DMA circuitry can issue requests to invalidate one or more cache lines.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (e.g., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (e.g., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM).

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, or NVM devices that use chalcogenide phase change material (for example, chalcogenide glass).

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Figure 8:
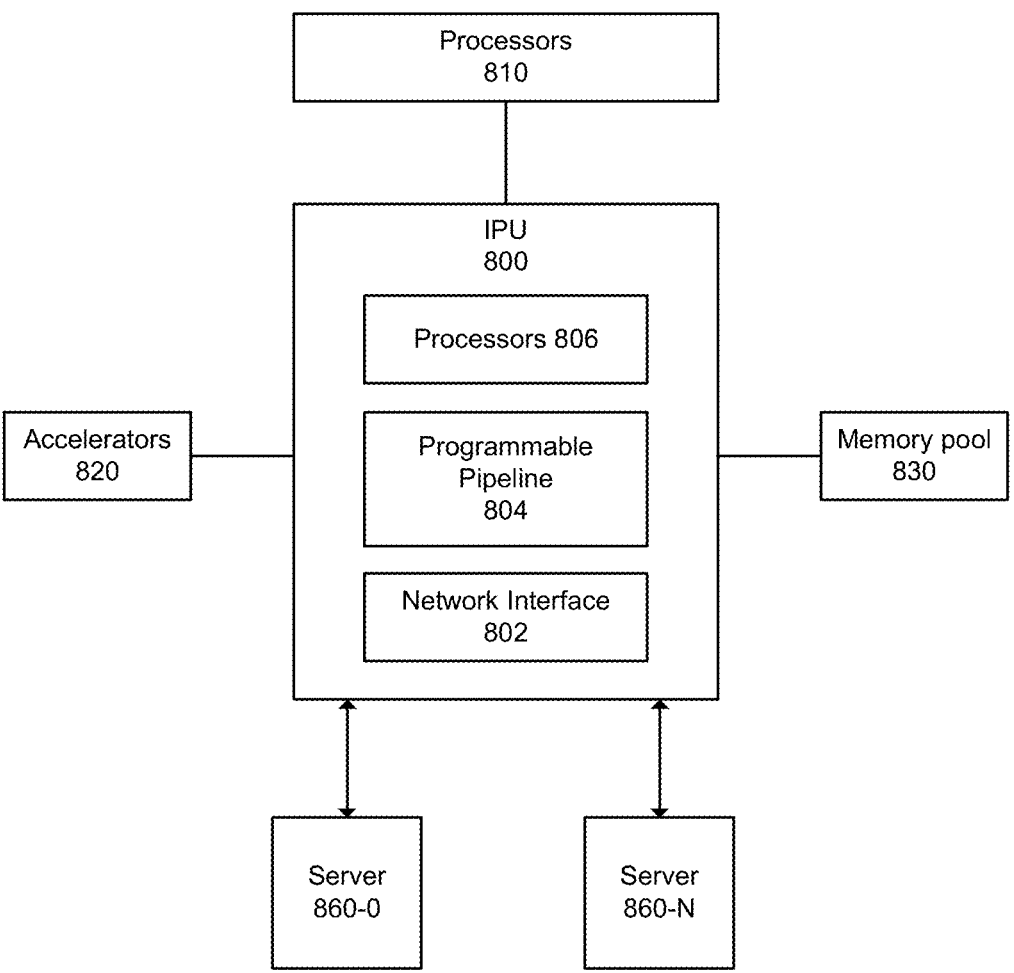
FIG. 8 depicts a system.

FIG. 8 depicts an example system. In this system, IPU 800 manages performance of one or more processes using one or more of processors 806, processors 810, accelerators 820, memory pool 830, or servers 840-0 to 840-N, where N is an integer of 1 or more. In some examples, processors 806 of IPU 800 can execute one or more processes, applications, VMs, containers, microservices, and so forth that request performance of workloads by one or more of: processors 810, accelerators 820, memory pool 830, and/or servers 840-0 to 840-N. IPU 800 can utilize network interface 802 or one or more device interfaces to communicate with processors 810, accelerators 820, memory pool 830, and/or servers 840-0 to 840-N. IPU 800 can utilize programmable pipeline 804 to process packets that are to be transmitted from network interface 802 or packets received from network interface 802. Programmable pipeline 804 and/or processors 806 can be configured to request invalidation of one or more cache lines associated with a memory address range, as described herein.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising a device to be coupled a processor by a device interface, wherein the device comprises: circuitry to issue a single command to request invalidation of multiple cache lines associated with a memory address range in a cache device, wherein the cache device is associated with the processor and wherein the processor comprises one or more of a central processing unit (CPU), core, or graphics processing unit (GPU).

Example 2 includes one or more examples, wherein the single command is to request a read of data from the memory address range and invalidation or eviction of multiple cache lines associated with the memory address range.

Example 3 includes one or more examples, wherein the device comprises a network interface device and the single command is provided in a packet transmit descriptor.

Example 4 includes one or more examples, wherein the single command is provided in a Peripheral Component Interconnect Express (PCIe) consistent transaction layer packet (TLP) Processing Hint (TPH).

Example 5 includes one or more examples, wherein the single command is to cause a caching agent (CA) to mark the multiple cache lines associated with the memory address range as invalid or evict data associated with the multiple cache lines based on the request being a permitted request.

Example 6 includes one or more examples, wherein the single command is associated with one or more settings in a descriptor.

Example 7 includes one or more examples, wherein the device interface is to perform at least one of: provide communications between the device and the processor on different dies, provide communications between the device and the processor on different chips, provide communications between the device and the processor on different chiplets, provide communications between the device and the processor on different circuit boards, or provide communications between the device and the processor on different packages.

Example 8 includes one or more examples, wherein the device comprises one or more of: a network interface device, accelerator, storage device, memory device, graphics processing unit, or audio or sound processing device.

Example 9 includes one or more examples, comprising a host system communicatively coupled to the device, wherein the host system comprises the cache device to store data associated with the multiple cache lines.

Example 10 includes one or more examples, and includes at least one non-transitory computer-readable medium comprising instructions stored thereon, that if executed by one or more processors, cause the one or more processors to: execute an operating system (OS) to: configure circuitry with one or more permitted requesters and enable invalidation of multiple cache lines of a cache device associated with a memory address range based on a single command received from a device that requests invalidation of the multiple cache lines associated with a memory address range and based on the single command being provided by a permitted requester among the one or more permitted requesters, wherein the cache device is associated with a processor and wherein the processor comprises one or more of a central processing unit (CPU), core, or graphics processing unit (GPU).

Example 11 includes one or more examples, wherein the single command is to request a read of data from the memory address range and invalidation or eviction of multiple cache lines associated with the memory address range.

Example 12 includes one or more examples, wherein the device comprises a network interface device and the single command is provided in a packet transmit descriptor.

Example 13 includes one or more examples, wherein the single command is provided in a Peripheral Component Interconnect Express (PCIe) consistent transaction layer packet (TLP) Processing Hint (TPH).

Example 14 includes one or more examples, wherein the single command is to cause a caching agent (CA) to mark the multiple cache lines associated with the memory address range as invalid or evict data associated with the multiple cache lines based on the request being a associated with a permitted requester.

Example 15 includes one or more examples, wherein the request is permitted based on the single command being provided in a descriptor associated with a descriptor ring and invalidation or eviction of multiple cache lines is permitted from one or more descriptors from the descriptor ring.

Example 16 includes one or more examples, wherein the device comprises one or more of: a network interface device, accelerator, storage device, memory device, graphics processing unit, or audio or sound processing device.

Example 17 includes one or more examples, and includes a method comprising: invalidating multiple cache lines in a cache device based on receipt of a single command from a device that requests invalidation of the multiple cache lines associated with a memory address range and based on the single command provided by an approved requester, wherein the cache device is associated with a processor and wherein the processor comprises one or more of a central processing unit (CPU), core, or graphics processing unit (GPU).

Example 18 includes one or more examples, wherein the single command is to request a read of data from the memory address range and invalidation or eviction of multiple cache lines associated with the memory address range.

Example 19 includes one or more examples, wherein the device comprises a network interface device and the single command is provided in a packet transmit descriptor.

Example 20 includes one or more examples, wherein the single command is to cause a caching agent (CA) to mark the multiple cache lines associated with the memory address range as invalid or evict data associated with the multiple cache lines based on the request being a permitted request.

What is claimed is:

1. A method comprising:
invalidating multiple cache lines associated with a memory address range in a cache device based on receipt of a command from a device, wherein the command requests reading of data stored in the multiple cache lines and invalidation of the multiple cache lines, wherein the cache device is associated with a processor, wherein the processor comprises one or more of a central processing unit (CPU), core, or graphics processing unit (GPU), wherein a descriptor includes the command, and wherein the descriptor is to request the device to transmit a packet that includes the data stored in the multiple cache lines that are to be invalidated.

2. The method of claim 1, wherein the command is to request evicting the multiple cache lines associated with the memory address range.

3. The method of claim 1, wherein the device comprises a network interface device.

4. The method of claim 1, comprising: a caching agent (CA) marking the multiple cache lines associated with the memory address range as invalid or evicting data associated with the multiple cache lines based on the command being a permitted request.

5. An apparatus comprising:
a device to be coupled to a processor by a device interface, wherein the device comprises:
circuitry, wherein the circuitry is to receive a descriptor, wherein the descriptor comprises a command that is to cause the circuitry to read data associated with a memory address range and cause invalidation of multiple cache lines associated with the memory address range in a cache device, wherein the cache device is associated with the processor, wherein the processor comprises one or more of a central processing unit (CPU), core, or graphics processing unit (GPU), and wherein the descriptor is to request the device to transmit a packet that includes the data stored in the multiple cache lines that are to be invalidated.

6. The apparatus of claim 5, wherein the command is to request eviction of the multiple cache lines associated with the memory address range.

7. The apparatus of claim 5, wherein the device comprises a network interface device.

8. The apparatus of claim 5, wherein the command is provided in a Peripheral Component Interconnect Express (PCIe) consistent transaction layer packet (TLP) Processing Hint (TPH).

9. The apparatus of claim 5, wherein the command is to cause a caching agent (CA) to mark the multiple cache lines associated with the memory address range as invalid or evict data associated with the multiple cache lines based on the command being a permitted command.

10. The apparatus of claim 5, wherein the command is associated with one or more settings in a descriptor.

11. The apparatus of claim 5, wherein the device interface is to perform at least one of: provide communications between the device and the processor on different dies, provide communications between the device and the processor on different chips, provide communications between the device and the processor on different chiplets, provide communications between the device and the processor on different circuit boards, or provide communications between the device and the processor on different packages.

12. The apparatus of claim 5, wherein the device comprises one or more of: a network interface device, accelerator, storage device, memory device, graphics processing unit, or audio or sound processing device.

13. The apparatus of claim 5, comprising a host system communicatively coupled to the device, wherein the host system comprises the cache device to store data associated with the multiple cache lines.

14. The apparatus of claim 5, wherein the invalidation of the multiple cache lines does not cause a writeback of the data in the multiple cache lines to memory.

15. At least one non-transitory computer-readable medium comprising instructions stored thereon, that if executed by one or more processors, cause the one or more processors to:

execute an operating system (OS) to:

configure circuitry with one or more permitted requesters and enable invalidation of multiple cache lines of a cache device associated with a memory address range based on a command received from a device that requests a read of data from the multiple cache lines and invalidation of the multiple cache lines and based on the command being provided by a permitted requester among the one or more permitted requesters, wherein the cache device is associated with a processor, wherein the processor comprises one or more of a central processing unit (CPU), core, or graphics processing unit (GPU), wherein a descriptor includes the command, and wherein the descriptor is to request the device to transmit a packet that includes the data stored in the multiple cache lines that are to be invalidated.

16. The at least one computer-readable medium of claim 15, wherein the command is to request a read of data from the memory address range and eviction of multiple cache lines associated with the memory address range.

17. The at least one computer-readable medium of claim 16, wherein the request is permitted based on the descriptor being associated with a descriptor ring and invalidation or eviction of multiple cache lines is permitted from one or more descriptors from the descriptor ring.

18. The at least one computer-readable medium of claim 16, wherein the device comprises one or more of: a network interface device, accelerator, storage device, memory device, graphics processing unit, or audio or sound processing device.

19. The at least one computer-readable medium of claim 15, wherein the device comprises a network interface device, wherein the command is to not cause writeback of the data from the multiple cache lines to memory.

20. The at least one computer-readable medium of claim 15, wherein the command is provided in a Peripheral Component Interconnect Express (PCIe) consistent transaction layer packet (TLP) Processing Hint (TPH).

21. The at least one computer-readable medium of claim 15, wherein the invalidation of the multiple cache lines is to cause a caching agent (CA) to mark the multiple cache lines associated with the memory address range as invalid or evict data associated with the multiple cache lines based on the command being associated with the permitted requester.

* * * * *